VAPOR DEPOSITION PROCESS WHEREIN THE VAPOR CONTAINS BOTH DONOR AND ACCEPTOR IMPURITIES

Filed May 9, 1962

INVENTOR
JOHN C. MARINACE

BY

ATTORNEY 3,178,798

VAPOR DEPOSITION PROCESS WHEREIN THE VAPOR CONTAINS BOTH DONOR AND ACCEPTOR IMPURITIES

John C. Marinace, Yorktown Heights, N.Y., assignor to International Business Machines Corporation, New York, N.Y., a corporation of New York Filed May 9, 1962, Ser. No. 193,480
9 Claims. (Cl. 29—25.3)

This invention relates to the art of vapor growth of semiconductor bodies suitable for use in signal translating devices and, in particular, to a technique which permits the reproducible fabrication of special junction devices which are designed to include a plurality of vapor-grown layers of semiconductor material and to possess an impurity concentration gradient.

The art of vapor growth of semiconductor bodies embraces a number of processes which depend upon essentially different mechanisms but which have in common the result of deposition of semiconductor material from the vapor phase onto a substrate. The present invention deals particularly with one of these processes which shall be designated the halide disproportionation process. Briefly, in this process, a semiconductor source material is reacted with a halogen transport element in a first temperature zone of a reaction container to form thereby one predominant vaporous semiconductor halide compound. The compound thus formed circulates to, and is decomposed in, a second temperature zone thereby freeing the semiconductor material which deposits epitaxially and forms a layer on a substrate provided in a second zone. The essential reaction involved in this process may be simply written, for germanium, as:

$$2GeI_2 \rightleftarrows Ge + GeI_4$$

The halide disproportionation process has been successful in producing epitaxial growth which is crucial in the formation of semiconductor bodies which are required to be monocrystalline throughout. Monocrystallinity is essential, for example, in the formation of a transistor device where, for proper flow of minority carriers, there must be no trapping which would eventuate if polycrystalline deposits were formed in the body.

The halide disproportionation process has been practiced heretofore in either an open-tube type of system or a closed-tube type. The technique of the present invention will be explained hereinafter with reference to the closed-tube type of system but it will be apparent that it is also applicable to the open-tube type of system.

A major difficulty presents itself in the formation of a plurality of vapor-grown layers of opposite conductivity-type when it is desired that the portion grown upon the substrate should have a gradient of impurity concentration. It is extremely difficult in the growth of these layers to determine precisely, for a number of runs directed at the production of identical structures, the exact point when the conductivity change should be initiated. Thus, the vapor-growth process is not readily controllable for the purpose of obtaining layers with a gradient of impurity concentration. This will be appreciated from the fact that an initially-deposited layer may be required to have a thickness on the order of several microns.

It is, therefore, a principal object of the present invention to provide a technique for reproducibly forming a plurality of vapor-grown layers upon a semiconductor substrate.

It is another object to provide a built-in control in the vapor-growth process of forming plural layers when a gradient of impurity concentration is to be achieved.

Another object is to provide such built-in control as to obviate the need for adjustment by the operator during the process of the temperature and vapor flow.

Yet another object is to permit the reproducible formation of an entire class of semiconductor structures requiring in their makeup a gradient of impurity concentration.

A formula has been given for the halide disproportionation process for the simple case of transport of only semiconductor material. However, since in most applications the halide disproportionation process is directed to forming semiconductor bodies or structures useful in the production of junction devices, it is necessary to obtain doping of the deposited material. Thus, in the halide disproportionation process, it is the practice to provide doping of the semiconductor source material or to dispose a separate dopant in the source region of the reaction container. The reaction then proceeds so that the halogen, for example iodine, which is employed reacts with both the semiconductor source material and the impurity, disposed separately or contained within the source material, with the eventual result of growth of semiconductor material of predetermined conductivity-type. In the situation of sequential formation of opposite conductivity layers it is, of course, necessary to control the introduction of opposite conductivity-determining impurities into the vapor-growth process.

What has been discovered is that in the deposition part of the process, the acceptor iodides are more stable than the donor iodides. By this is meant that in the deposition stage, where the composite vapors are caused to yield both the semiconductor material and the impurities to be incorporated in the deposit, the acceptor iodides do not immediately yield the aceptor impurities whereas the donor iodides do so much more readily. This is because the bonding between an acceptor and a halogen is greater than the bonding between a donor and a halogen. In accordance with a feature of the present invention, this discovery is exploited to provide change of conductivity in a controllable, graded manner. Thus, in forming plural-layer devices, as heretofore described, the materials are so selected and arranged and the operating conditions are such that when the vapor-growth run is started there is a simultaneous reaction of the transport element with the semiconductor source material and with the several impurities. As one example, donors and acceptors in the source material react with iodine as the source germanium atoms are removed from around them. (It will be appreciated, of course, that reference here is to the previously-mentioned doped sources of semiconductor material.) Although the concentrations of the donor iodides and acceptor iodides in the combined vapor at early stages can exist in practically the same proportions as they do in the source material, more donors than acceptors will be incorporated in the initially-deposited semiconductor material due to the aforesaid greater stability of the acceptor iodides. As the concentration of acceptor iodides in the vapor gradually increases, the deposited semiconductor material will contain a gradually increasing concentration of acceptors. With a judicious initial selection of concentration of acceptors in the source material, the concentration of acceptors in the deposited material will eventually exceed the concentration of donors and, as a result, an N-P junction is formed.

Since the thickness of the initially-formed n-type layer and the concentrations at the junction depend mainly upon the kinds and relative concentrations of the donors and acceptors in the source, the process of the present invention is much more reproducible than other methods for producing similar kinds of junctions. To a lesser extent, the thickness of the n-type layer and the concentration gradient depend upon the temperature and concentrations of the iodides.

The foregoing and other objects, features and advantages of the invention will be apparent from the following more particular description of preferred embodiments of the invention as illustrated in the accompanying drawings.

Figure 1:
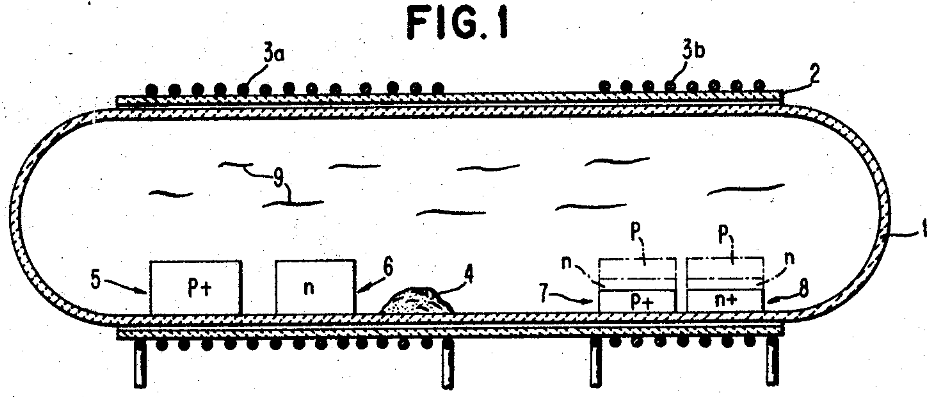
FIG. 1 is a side view of the apparatus employed with the technique of the present invention.

Referring now to FIG. 1, there is illustrated a closed-tube type of system for applying the technique of the present invention. A sealed reaction container labelled 1 is shown surrounded by a refractory material 2 and a plurality of windings *3a* and *3b*, which windings are connected to a source of power not shown. Enclosed within the reaction container is a source of iodine, or similar halogen, labelled 4. Two sources of semiconductor material 5 and 6 are shown disposed on the left in the tube. Source 5 is, for example, p-conductivity-type germanium, that is, semiconductor source material 5 has included therein a quantity of a typical acceptor such as gallium. Source 6 has included therein a typical donor such as antimony. The concentration of the acceptor impurity in the source 5 is generally chosen to be much higher than the concentration of the donor impurity in the source 6. This is generally denoted by the symbol p+ for the source 5. Typically, this difference of concentration would be approximately 10 times or more. As an example, the acceptor concentration would be approximately $5 \times 10^{19}$ atoms/cc., and the donor concentration, approximately $2 \times 10^{15}$ atoms/cc. It will be understood that, rather than the separate sources 5 and 6, a single source of compensated material may be used. On the right within the container 1, a semiconductor structure labelled 7 is shown having a plurality of grown layers and another semiconductor structure labelled 8 also having a plurality of grown layers. These two examples are just several of many basic structures that may be obtained with the technique of the present invention.

Figure 2:
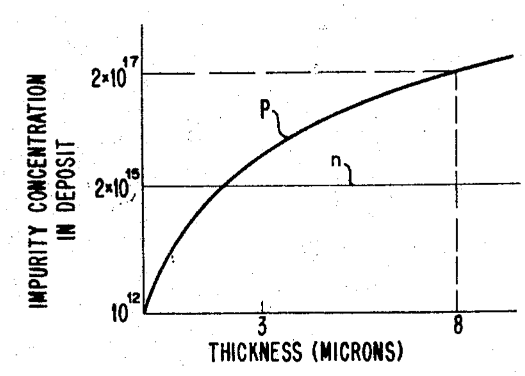
FIG. 2 is a graph depicting the impurity concentration variation in the deposited material with time.

The vapor-growth process is initiated by applying power to the windings *3a* and *3b* whereby the iodine on the left of the tube vaporizes to provide the requisite ambient. The energized windings *3a* and *3b* provide the temperatures required in the suorce region and the substrate region. Typically, these temperatures would be 500° C. in the source region and 380° C. in the substrate region. With such a temperature gradient, the iodine reacts with the source materials to form as a principal product $GeI_2$ and also to form iodides with the respective impurities contained in the sources 5 and 6. The combined vapors thus produced are labelled 9. As has been indicated previously, the semiconductor compound, that is, the vaporous $GeI_2$, flows to the substrate region and forms $GeI_4$ and solid germanium which deposits upon the substrate. Concomitantly therewith, the iodides decompose and deposit on the substrate. However, due to the differing quasi-segregation coefficients, that is, the differing propensities of the acceptor and donor iodides to be inporated in the deposits, because of the differing stabilities as mentioned above for the acceptor and donor iodides, the initially-depositing material is of n-conductivity-type. The mechanism of this procedure is explainable with reference to FIG. 2 where it will be seen that the n-type impurity concentration is at a constant value throughout the thickness of the deposit, whereas the p-type impurity concentration gradually increases with increasing thickness of deposit before reaching a final high, steady-state, value. In the particular example depicted by the graph of FIG. 2, the n-type concentration has been selected to be approximately $2 \times 10^{15}$ atoms/cc.; however, this concentration can be varied to control the thickness of the n-type layer that is formed. As will be obvious from FIG. 2, a change in the n-conductivity impurity concentration produces a change of the point at which the p-conductivity concentration in the deposit becomes equal to the n-conductivity-type impurity concentration. It is to be noted that, although in FIG. 2 there is illustrated the case where the p-type impurity concentration at some selected thickness, denoted by the dotted line, has overcome the n-type impurity concentration, this is not the only possible case and, in fact, the p-type concentration could be chosen so as to reach a steady-state value that exactly corresponds with the n-type impurity concentration, thus resulting in the formation of an instrinsic region.

Figure 3A:
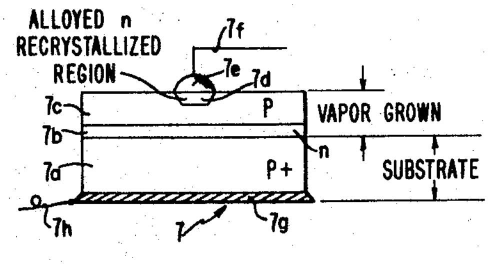
FIGS. 3A, 3B, 3C and 3D illustrate several exemplary devices that can be reproducibly formed in accordance with the technique of the present invention.

A class of devices that may be realized from the basic structures labelled 7 and 8 in FIG. 1 may be seen in FIGS. 3A, 3B, 3C and 3D. In FIG. 3A, the semiconductor structure 7 consists of a substrates region *7a*, which is the substrate upon which material has been deposited following the technique of the present invention. Layers *7b* and *7c* are grown by the aforesaid technique based upon the differing quasi-segregation coefficients of the different impurities. With the basic semiconductor structure 7, a conventional procedure is followed of alloying on the top surface thereof so as to produce an n-type recrystallized region *7d* by the use of an n-type impurity in the alloy member *7e*. For circuit-connecting purposes a conductor *7f* is soldered or otherwise attached to the alloy member *7e*. To the bottom surface of the structure 7, an ohmic contact *7g* is made in accordance with standard practice and a conductor *7h* is attached to the ohmic contact *7g*. Thus, what is realized is a four-layer diode which possesses unique characteristics well known to those skilled in the art.

Figure 3C:
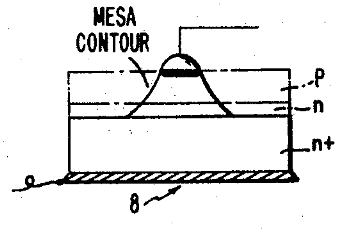
Figure 3B:
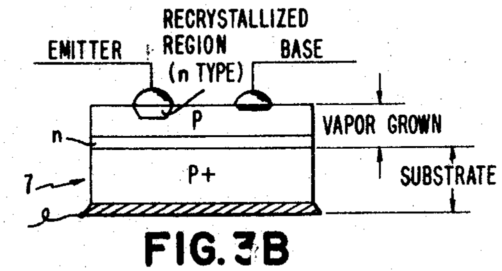

Referring now to FIG. 3B, a modification is shown where a slightly different type of device, namely a PNPN transistor, is produced from the semiconductor structure 7. The same vapor-grown layers are produced on the substrate, but, unlike the device of FIG. 3A, both an ohmic contact and an alloyed, rectifying contact are formed on the top surface of the structure 7. In this configuration, the topmost layer of p-conductivity-type serves as the base region of the transistor and the emitter is formed by the aforesaid alloying into this base region so that a recrystallized, n-conductivity-type, emitter region is produced as illustrated. The base contact on the top surface is made in a similar manner to the rectifying contact except that an impurity of the same conductivity-type as the top region is employed. Similar to the fabrication of the device of FIG. 3A, the usual ohmic contact is made to the bottom surface of the substrate and suitable leads are attached to the several electrodes.

Referring now to FIG. 3C, a further modification is shown wherein a computer or switching diode is fabricated. Such a switching diode provides a switching speed on the order of 2–3 microseconds and has a low capacitance due to the formation of a graded junction by the technique of the present invention. The device of FIG. 3C is obtained from the basic structure 8 illustrated in FIG. 1, that is, the type of structure where an n+ substrate is used and the alternate n and p layers are grown thereon. An ohmic contact is formed on the top surface of the structure 8 and thereafter the bulk of the grown layers is etched away so that a mesa contour is produced as illustrated by the solid lines in FIG. 3C. The computer or switching diode thus realized, along with its high switching speed, has a very high reverse breakdown voltage on the order of 30 volts.

Figure 3D:
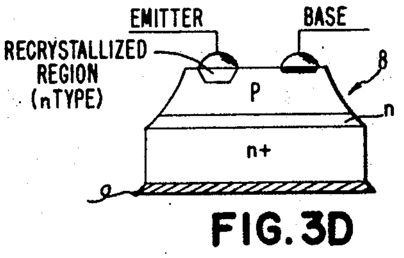

Referring now to FIG. 3D, there is shown a modification which results in the formation of an NPN transistor device. In this case, the device is formed from the semiconductor structure 8. Like FIG. 3C, the structure 8 consists of an n+ substrate upon which the alternate conductivity-type layers are sequentially grown, but, like FIG. 3B, both ohmic and alloyed, rectifying contacts are made to the topmost surface of the structure 8.

In order to furnish the man skilled in the art with some details involved in the practice of the technique of the present invention, the following specification is provided for a typical run:

A closed reaction tube 22 cm. long with an inside diameter of 2.2 cm. is used. The source germanium pieces have a size of approximately ¼ in. x ¼ in. x 5 in. The substrates have dimensions of 1.3 cm. x 1.3 cm. x 0.1 cm. A quantity of iodine, or other halogen transport element, approximately 10–50 mg. is used. The hot zone, that is, the zone where the source material is located, is held at a temperature of approximately 500° C., and the cool zone, where the substrates are located is held at 380° C. A growth rate of 12 microns/hr. is thus achieved. In a typical run, for the case where the source 5 in FIG. 1 is doped with gallium to a level of $5 \times 10^{19}$ atoms/cc. and the source 6 with antimony to a level of $2 \times 10^{15}$ atoms/cc., this results in the growth of the n-type region on the substrate to a thickness of approximately 3 microns.

What has been disclosed is a technique useful in the vapor growth of semiconductor bodies and advantageously adapted, due to the discovery of the differing propensities of the impurities, to the formation of a class of special junction-type semiconductor devices. In the fabrication of such devices, there is produced a plurality of vapor-grown layers upon a substrate and the semiconductor devices are designed to possess an impurity concentration gradient. Following the technique of the present invention, these special devices can be formed reproducibly due to the automatic control that the novel technique affords thereby obviating the need for adjustment during vapor growth of the temperature and vapor flow.

While the invention has been particularly shown and described with reference to preferred embodiments thereof, it will be understood by those skilled in the art that various changes in form and details may be made therein without departing from the spirit and scope of the invention.

What is claimed is:

1. A process of producing a vapor-grown semiconductor structure wherein a plurality of layers having a gradient of impurity concentration are grown upon a semiconductor substrate, comprising the steps of:
   simultaneously reacting in a first zone of a reaction container a halogen transport element with a source of semiconductor material and at least two sources of impurities of opposite conductivity type, the p type impurity predominating, to form combined halide vapors of the semiconductor material and the respective impurities of opposite conductivity type, the propensity of the p type impurity to remain in the halide being greater than the propensity of the n type impurity so to remain;
   disposing a semiconductor substrate in a second zone of said reaction container;
   providing a temperature gradient between said first zone and said second zone to free the semiconductor matelial and the respective impurities from said combined halide vapors over said semiconductor substrate whereby, due to the greater propensity of the p type impurity to remain in the halide, the initially grown thin layer of semiconductor material upon said substrate is of n conductivity type.

2. A process of producing a vapor-grown semiconductor structure wherein a plurality of layers having a gradient of impurity concentration are grown upon a semiconductor substrate, comprising the steps of;
   simultaneously reacting a halogen transport element with both a source of a semiconductor material and at least two impurities of opposite conductivity type, all of which are situated in a first zone of a reaction container to form halide vapors, the propensity of the p type impurity to remain in the halide being greater than the propensity of the n type impurity so to remain;
   passing the halide vapors produced by said first step over a semiconductor substrate situated in a second zone of said reaction container;
   providing a temperature gradient between said first and second zones of said reaction container to free the semiconductor material and the respective impurities from said halide vapors whereby, due to the greater propensity of the p type impurity to remain in the halide, the initially grown layer of semiconductor material upon said substrate is of n conductivity type and a gradient of impurity concentration is obtained in said grown layers.

3. A process as defined in claim 2 wherein first and second sources of semiconductor material of opposite conductivity-type are disposed in said first zone.

4. A process as defined in claim 3 wherein the concentration of p-type impurity in said first source is selected to be greater than the concentration of n type impurity in said second source.

5. A process as defined in claim 4 wherein the concentration of p-type impurity in said first source is approximately $5 \times 10^{19}$ atoms/cc. and the concentration of said n-type impurity in said second source is approximately $2 \times 10^{15}$ atoms/cc.

6. A process as defined in claim 2 wherein a plurality of semiconductor substrates of different conductivity are disposed in said second zone whereby different semiconductor structures are achieved.

7. A process for producing a vapor-grown semiconductor device wherein an initial semiconductor structure is vapor-grown and consists of a plurality of layers on a semiconductor substrate having a gradient of impurity concentration therein, comprising the steps of:
   simultaneously reacting a halogen transport element with both a source of semiconductor material and at least two impurities of opposite conductivity type, all of which are situated in a first zone of a reaction container, to form halide vapors, the propensity of the p type impurity to remain in the halide being greater than the propensity of the n type impurity so to remain;
   passing the halide vapors produced by said first step over a semiconductor substrate situated in a second zone of said reaction container;
   providing a temperature gradient between said first and second zones of said reaction container to free the semiconductor material and the respective impurities from said halide vapors over said semiconductor substrate whereby, due to the said respective propensities of the acceptor and donor impurities, a first thin layer of grown semiconductor material upon said substrate is of n conductivity type and the second layer is of p conductivity type, said first and and second layers defining a graded junction;
   forming a contact to said grown p type layer and attaching an electrical conductor to said contact;
   and forming an ohmic contact to said substrate and attaching an electrical conductor thereto.

8. A process of producing a vapor grown semiconductor device wherein an initial semiconductor substrate is fabricated consisting of a plurality of vapor grown layers on a semiconductor substrate and having a gradient of impurity concentration therein, comprising the steps of:
   simultaneously reacting a halogen transport element with both a source of semiconductor material and at least two impurities of opposite conductivity type, all of which are situated in a first zone of a reaction container, to form halide vapors, the propensity of the p type impurity to remain in the halide being greater than the propensity of the n type impurity so to remain;
   passing the halide vapors produced by said first step over a semiconductor substrate of predetermined conductivity type situated in a second zone of said reaction container;

providing a temperature gradient between said first and second zones of said reaction container to free the semiconductor material and the respective impurities from said halide vapors whereby, due to said respective propensities of the acceptor and donor impurities contained therein, a first thin layer of grown semiconductor material upon said substrate is of n conductivity type and the second layer is of p conductivity type with a gradient of impurity concentration in said grown layers;

forming at least one contact to the vapor grown layer of p conductivity type;

and forming an ohmic contact to said substrate.

9. A process of producing a switching diode by vapor growth of semiconductor material, wherein a plurality of layers having a gradient of impurity concentration are grown upon a semiconductor substrate, comprising the steps of:

situating a first p conductivity zone and a second n conductivity zone of semiconductor material and a source of iodine in a first zone of a reaction container;

reacting said source of iodine with said first p conductivity source and said second n conductivity source of semiconductor material to form halide vapors, the propensity of p type impurity to remain in the halide being greater than the propensity of the n type impurity so to remain;

disposing a highly doped n type conductivity semiconductor substrate in a second zone of said reaction container;

providing a temperature gradient in said reaction container between said first and second zones to free the semiconductor material and the respective impurities from said halide vapors over said semiconductor substrate whereby due to the greater propensity of the p type impurity to retain in the halide, the initially formed vapor grown layer upon said highly doped n type substrate is of n conductivity type and the next grown layer is of p conductivity type;

allowing an ohmic contact to the p conductivity layer grown upon said substrate and forming an ohmic contact on the bottom of said substrate;

etching away the bulk of both the n and p conductivity vapor grown layers so as to leave only a mesa-like portion of semiconductor material upon said substrate and attaching electrical leads to both of said ohmic contacts.

References Cited by the Examiner

UNITED STATES PATENTS

| | | | |
|---|---|---|---|
| 3,065,113 | 6/59 | Lyons | 148—175 |
| 3,014,820 | 12/61 | Marinace et al. | 142—175 |
| 3,046,459 | 7/62 | Anderson et al. | 148—175 |
| 3,066,052 | 11/62 | Howard | 148—1.5 |

FOREIGN PATENTS

| | | |
|---|---|---|
| 682,105 | 11/52 | Great Britain. |

DAVID L. RECK, *Primary Examiner.*